US011331734B2

(12) United States Patent
Stadtfeld (10) Patent No.: US 11,331,734 B2
(45) Date of Patent: May 17, 2022

(54) METHOD OF MACHINING GEARS TO PRODUCE A SINUSOIDAL-PARABOLIC HYBRID MOTION ERROR, GEAR THUS PRODUCED AND MACHINE FOR PERFORMING SAID METHOD (71) Applicant: THE GLEASON WORKS, Rochester, NY (US)

(72) Inventor: Hermann J. Stadtfeld, Webster, NY (US)

(73) Assignee: THE GLEASON WORKS, Rochester, NY (US)

( * ) Notice: Subject to any disclaimer, the term of this patent is extended or adjusted under 35 U.S.C. 154(b) by 159 days.

(21) Appl. No.: 16/498,638

(22) PCT Filed: Apr. 20, 2018

(86) PCT No.: PCT/US2018/028569
§ 371 (c)(1),
(2) Date: Sep. 27, 2019

(87) PCT Pub. No.: WO2018/187820
PCT Pub. Date: Oct. 11, 2018

(65) Prior Publication Data
US 2020/0030899 A1  Jan. 30, 2020

Related U.S. Application Data (60) Provisional application No. 62/480,581, filed on Apr. 3, 2017.

(51) Int. Cl.
B23F 17/00  (2006.01)
B23F 19/00  (2006.01)
(Continued)

(52) U.S. Cl.
CPC .......... B23F 17/001 (2013.01); B23F 19/002 (2013.01); B23F 5/16 (2013.01);
(Continued)

(58) Field of Classification Search
CPC ........ B23F 17/001; B23F 19/002; B23F 5/16; B23F 5/205
See application file for complete search history.

(56) References Cited

U.S. PATENT DOCUMENTS 2,906,143 A * 9/1959 Walton .................. F16H 49/001
74/640
4,981,402 A  1/1991 Krenzer et al.
(Continued)

FOREIGN PATENT DOCUMENTS

EP  2081720 B1  12/2009

OTHER PUBLICATIONS

Gosselin, C.J. et al. "The Generating Space for Parabolic Motion Error Spiral Bevel Gears Cut by the Gleason Method", Journal of Mechanical Design, ASME International, vol. 115, Sep. 1993, pp. 483-489.
(Continued)

Primary Examiner — Alan Snyder
(74) Attorney, Agent, or Firm — Robert L. McDowell (57) ABSTRACT A method of machining a tooth flank of a gear with a gear machining tool. The method comprises rotating the tool and bringing the tool and the tooth flank into contact. Relative movements are provided between the tool and the gear to traverse the tool across the tooth flank along a path whereby the path produces a tooth flank geometry of a form which, when brought into mesh with a mating tooth flank under no load or light load to form a tooth pair, provides a motion graph curve comprising a sinusoidal portion (62, 89, 91, 90, 63) and a parabolic portion (92).

2 Claims, 10 Drawing Sheets (51) Int. Cl.
*B23F 5/16* (2006.01)
*B23F 5/20* (2006.01)
*B23F 23/00* (2006.01)

(52) U.S. Cl.
CPC .............. *B23F 5/205* (2013.01); *B23F 23/00* (2013.01); *B23Q 2210/006* (2013.01)

(56) References Cited

U.S. PATENT DOCUMENTS

| | | |
|---|---|---|
| 5,580,298 A | 12/1996 | Stadtfeld |
| 5,662,438 A | 9/1997 | Wiener et al. |
| 6,390,893 B1 | 5/2002 | Stadtfeld et al. |
| 6,712,566 B2 | 3/2004 | Stadtfeld et al. |
| 7,553,115 B2 | 6/2009 | McGlasson et al. |
| 9,409,244 B2 * | 8/2016 | Geiser ..................... B23F 5/04 |

OTHER PUBLICATIONS

International Search Report and Written Opinion for PCT/US2018/028569, ISA/EPO, dated Sep. 20, 2018, 14 pages.

\* cited by examiner

METHOD OF MACHINING GEARS TO PRODUCE A SINUSOIDAL-PARABOLIC HYBRID MOTION ERROR, GEAR THUS PRODUCED AND MACHINE FOR PERFORMING SAID METHOD

FIELD OF THE INVENTION

The invention is directed to gears and to a method of machining gears wherein the resulting gears exhibit rolling characteristics described by a hybrid tooth contact motion transmission error comprising a combination of sinusoidal and parabolic elements.

BACKGROUND OF THE INVENTION

It is well known in the gear industry that the area of bearing contact between tooth surfaces in mesh should be limited to keep the contact area within the boundaries of the teeth, thus preventing the tooth surfaces from coming into contact at their edges which can lead to tooth damage and/or gear failure.

In order to limit the area of tooth contact, it is necessary to modify a theoretical conjugate tooth flank surface by introducing modifications, particularly "crowning", to limit the contact area under no load or load to provide insensitivity to things such as gear housing tolerances, inaccuracies in the gear members and assembly, as well as deflections. Thus, instead of the entire tooth surface of mating flanks coming into contact during rolling, as would be the theoretical case with completely conjugate tooth flanks and a drive system having zero deflections and tolerances, mating flanks that have been modified usually contact one another at one point or along a line. Hence, the mating flank surfaces are conjugate only at this point or along the line. Contact is limited to an area of a size such that the contact area will remain within the tooth boundaries despite the effects of actual deflections, tolerances and load.

With crowning, however, comes motion error introduced by non-conjugate members rolling in mesh with one another. And with motion error comes noise.

Bevel and hypoid gears commonly have a parabolic motion error which is the result of circular crowning on the surface of the teeth in tooth profile (height or root-to-top) direction and lengthwise (toe-to-heel or face width) direction. The crowning allows for load-effected deflections in the gearbox housing, the bearings and shafts, and the gears themselves. Those deflections are a magnitude larger than in cylindrical gear transmissions which is related to the angular shaft orientation and the often cantilever style pinion support. Generally, as crowning increases, so does the amount of motion error introduced into the mating tooth pair. Increased crowing does protect the teeth from damages of edge contact, however, the accompanying increased amount of introduced motion error prevents smooth rolling of the gears.

Figure 1:
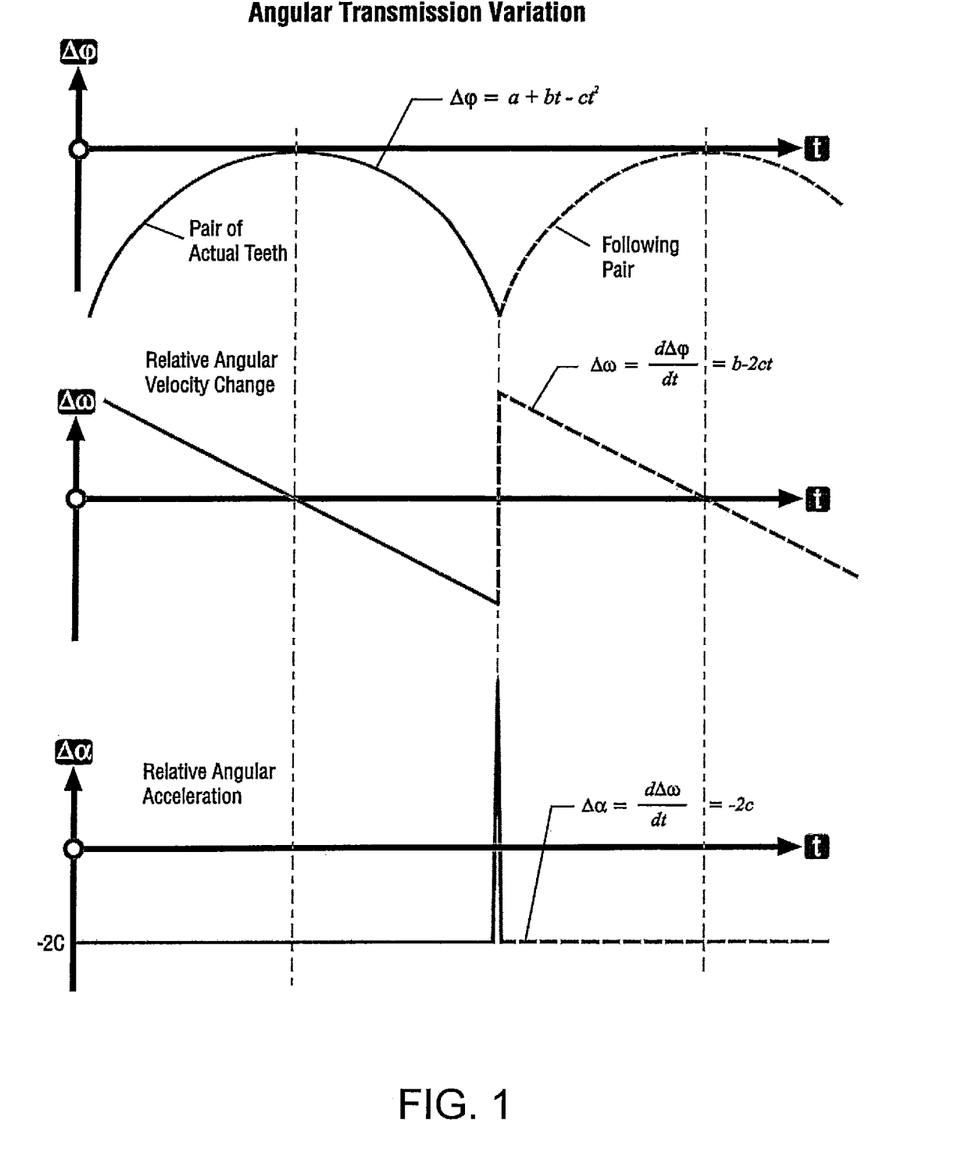
FIG. 1 shows a parabolic motion graph and the first two derivatives of the motion graph.

A bevel gearset without crowning would be conjugate which means it transmits the rotation of a driving pinion precisely with the ratio given by the division of the number of ring gear teeth by the number of pinion teeth. The parabolic motion error as shown on top in FIG. 1 ($\Delta\varphi$ over time) is caused by the crowning and leads to changes in angular velocity $\Delta\omega$ as shown in the first derivative of the motion error in the middle graphic of FIG. 1. At the moment of engagement of every new pair of teeth (during the rotation) the initial velocity level has to be re-established. The second derivative of the motion error at the bottom of FIG. 1 shows the angular acceleration graph $\Delta\alpha$. At the point of tooth engagement the graph shows a peak which is the result of the abrupt velocity step in the $\Delta\omega$ graphic above. The acceleration peak is considered an impulse which is the major source of gear noise.

Figure 2:
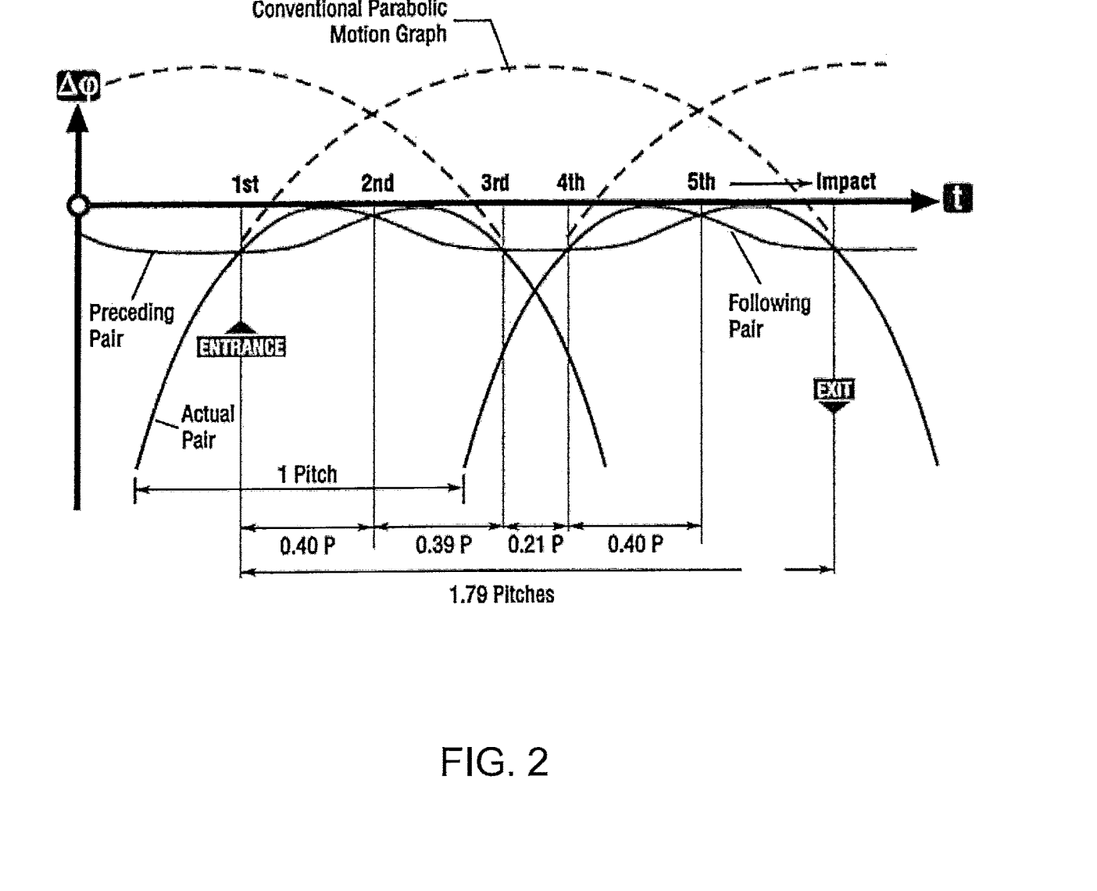
FIG. 2 shows an alternative motion graph function which is shaped like a double wave which provides an overlapping between consecutive tooth pairs.

Significant reductions in transmission noise have been possible with a double wave form as shown in FIG. 2, which is disclosed in commonly-assigned U.S. Pat. No. 6,390,893 the disclosure of which is hereby incorporated by reference. This wave form was possible with non-linear kinematics of the bevel gear generating machine. The double wave leads to overlapping consecutive motion graphs. The motion graph of FIG. 2 will produce 5 micro-impulses per tooth mesh rather than one great impulse. The problem of gear noise caused by tooth impacts can be reduced with the motion graph of FIG. 2 but it cannot be eliminated.

SUMMARY OF THE INVENTION

The invention is directed to a method of machining a tooth flank of a gear with a gear machining tool. The method comprises rotating the tool and bringing the tool and the tooth flank into contact. Relative movements are provided between the tool and the gear to traverse the tool across the tooth flank along a path whereby the path produces a tooth flank geometry of a form which, when brought into mesh with a mating tooth flank under no load or light load to form a tooth pair, provides a motion graph curve comprising a sinusoidal portion and a parabolic portion.

The invention is further directed to a method of machining tooth flank surfaces of mating gear members with a first tool for machining the tooth flank surfaces of one mating gear member, and a second tool for machining the tooth flank surfaces of the other mating gear member. The method comprises rotating the first tool and bringing the first tool and the tooth flank of one of the mating gear members into contact. Relative movements are provided between the first tool and the one mating gear member to traverse the first tool across the tooth flank along a first path. The method further comprises rotating the second tool and bringing the second tool and the tooth flank of the other mating gear member into contact. Relative movements are provided between the second tool and the other mating gear member to traverse the second tool across the tooth flank along a second path. Whereby the first path and the second path produces respective tooth flank geometries of a form which, when the mating gear members are brought into mesh under no load or light load to form a mating tooth pair, provides a motion graph curve comprising a sinusoidal portion and a parabolic portion.

The invention is also directed to a gear having a plurality of tooth flank surfaces with at least one tooth flank surface having a tooth flank geometry of a form which, when brought into mesh under no load or light load with a mating tooth flank to form a tooth pair, provides a motion graph curve comprising a sinusoidal portion and a parabolic portion.

DETAILED DESCRIPTION OF THE PREFERRED EMBODIMENT

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The phraseology and terminology used herein is for the purposes of description and should not be regarded as limiting. The subject matter should be understood by reference to the entire specification, all drawings and any claim below. The invention is capable of other constructions and of being practiced or being carried out in various ways.

The use of "including", "having" and "comprising" and variations thereof herein is meant to encompass the items listed thereafter and equivalents thereof as well as additional items.

The details of the invention will now be discussed with reference to the accompanying drawings which illustrate the invention by way of example only. In the drawings, similar features or components will be referred to by like reference numbers.

As mentioned above, FIG. 1 shows on top a parabolic motion graph which shows the $\Delta\varphi_{Gear}$ variation of an output shaft (ring gear) while the input shaft (pinion) rotates with the angle $\varphi_{Pinion}$. The center graphic in FIG. 1 is the first derivative $d\Delta\varphi_{Gear}/d\varphi_{Pinion}$ of the motion graph which represents the angular velocity variation of the gear in case of a constant pinion RPM. The bottom graphic in FIG. 1 shows the second derivative $d^2\Delta\varphi_{Gear}/d\varphi^2_{Pinion}$ of the motion graph which represents the angular acceleration of the driven gear in case of a constant pinion RPM. The step in the saw tooth shaped velocity graph causes a peak in the acceleration graph. The acceleration peak is physically required in order to re-establish the high angular velocity at the beginning of the next pair of teeth mesh. The acceleration peak is equal to an impulse which is also known as the tooth meshing impact. The tooth meshing impact is the major cause of gear noise. Reducing the amplitude of the motion graph $\Delta\varphi_{Gear}$ over $\varphi_{Pinion}$ will reduce the meshing impact but in turn it will also make the meshing flank surfaces more conjugate and more prone to load-effected deflections.

Previously discussed FIG. 2 shows an alternative motion graph function which is shaped like a double wave which provides an overlapping between consecutive tooth pairs. The original parabola shaped motion graph is in the upper area replaced by a fourth order function. The meshing tooth surfaces are more conjugate but due to the continuation of the motion graph below the entrance and exit point with the original parabolic shape also high loads can be transmitted without disadvantage. The motion transmission graph in FIG. 2 reduces the vibration and noise emission by converting one large entrance impact into 5 micro impacts but it will not eliminate noise generating impacts completely.

Figure 3:
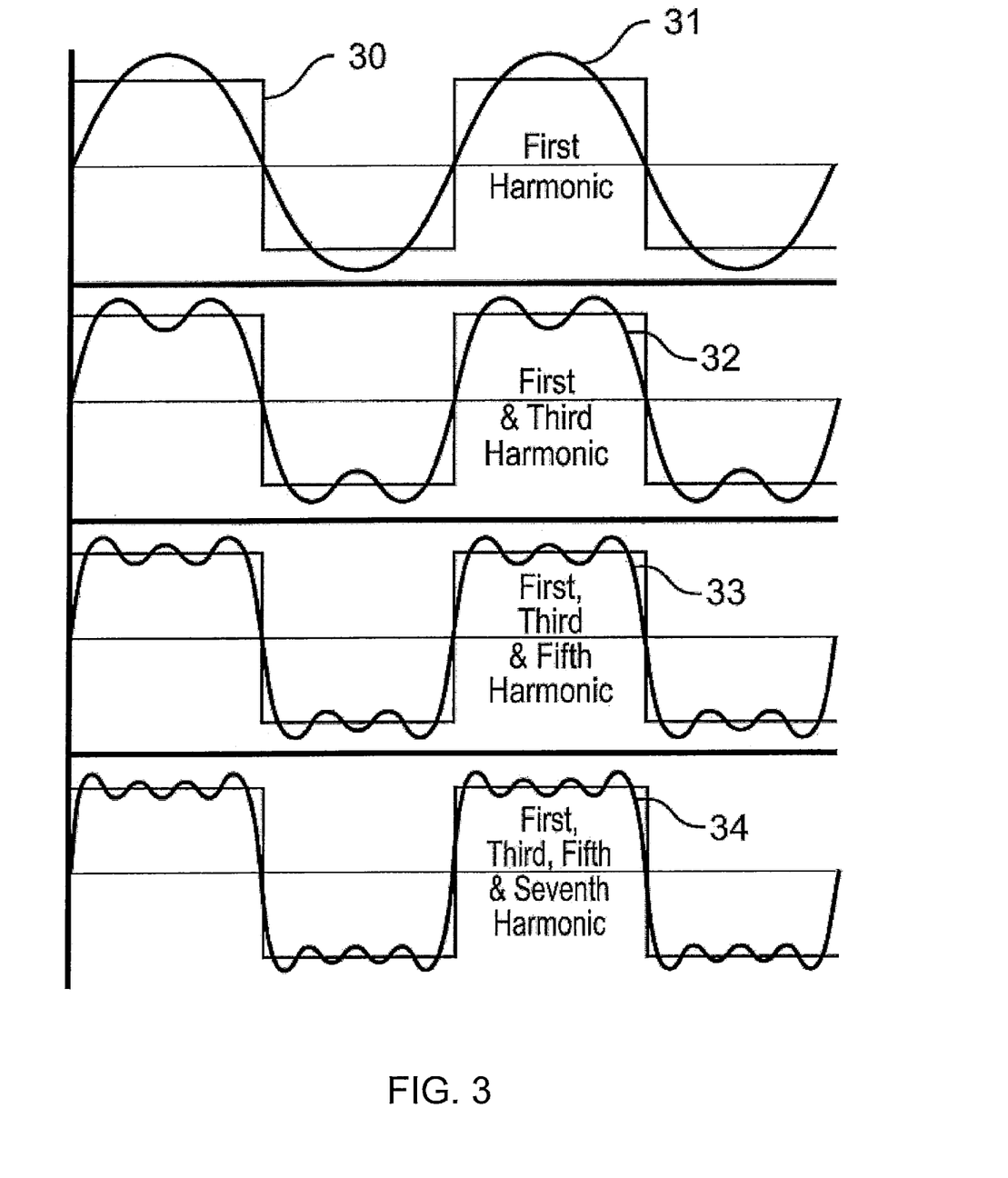
FIG. 3 shows the approximation of square wave with four sinusoidal functions.

The mechanics of transmitting vibrations through solid structures and the generation of airwaves conducted by vibrating solid structures as well as the transmission of airwaves to the human ear teaches that most known dynamic events are sinusoidal. This also applies to signals which appear not to have any sinusoidal content. FIG. 3 shows a square wave signal 30 which is approximated with a Fourier series of one (31), two (32), three (33) and four (34) different sinusoidal frequencies. The square wave 30 is in a first step approximated with a sine function 31 of the same frequency as the square wave. In a second step the square wave is approximated in addition to sine wave 31 with a sine wave three times the frequency of the square wave, resulting in graph 32. In a third step an additional sine wave of five times the square wave frequency is added, resulting in graph 33. In a fourth step an additional sine wave of seven times the frequency of the square wave is added in order to approximate the square wave even closer. The number of sine waves (orders) can be increased to an infinite number to reduce the residual approximation error between approximation function and square wave.

Square wave generators do not really generate square waves but utilize the Fourier principle in order to model the desired square waves. What is transmitted from a speaker when the electric input signal is a square wave (consisting of a multitude of different frequency sine waves) is also a multitude of sine waves.

Psychoacoustics teaches that the cochlear and its tectorial membrane are created to receive and recognize sinusoidal signals, even if the received signal was not sinusoidal. If the received airwave signal is not sinusoidal, then the tectorial membrane which has discrete areas to recognize different sinusoidal signals would perform a frequency summation which is effectively similar to a Fourier analysis.

The knowledge about sound transmission through air (or other media) and the recognition of this sound by the human ear leads to the conclusion that a single sine wave like the "First Harmonic" 31 in FIG. 3 would subjectively sound significantly quieter than the square wave approximated with three additional higher frequencies. Practical experiments show that a single "First Harmonic" sine wave sounds quiet and smooth and not disturbing. The experiments also prove that the superimposed frequencies at the bottom of FIG. 3 sound shrill, loud and disturbing.

The physical conclusion that single sine waves are received by the human ear much quieter than any other wave form with the same amplitude is based on the fact that a sinusoidal function provides the smoothest possible movement from the maximum to the minimum of the wave.

Figure 4:
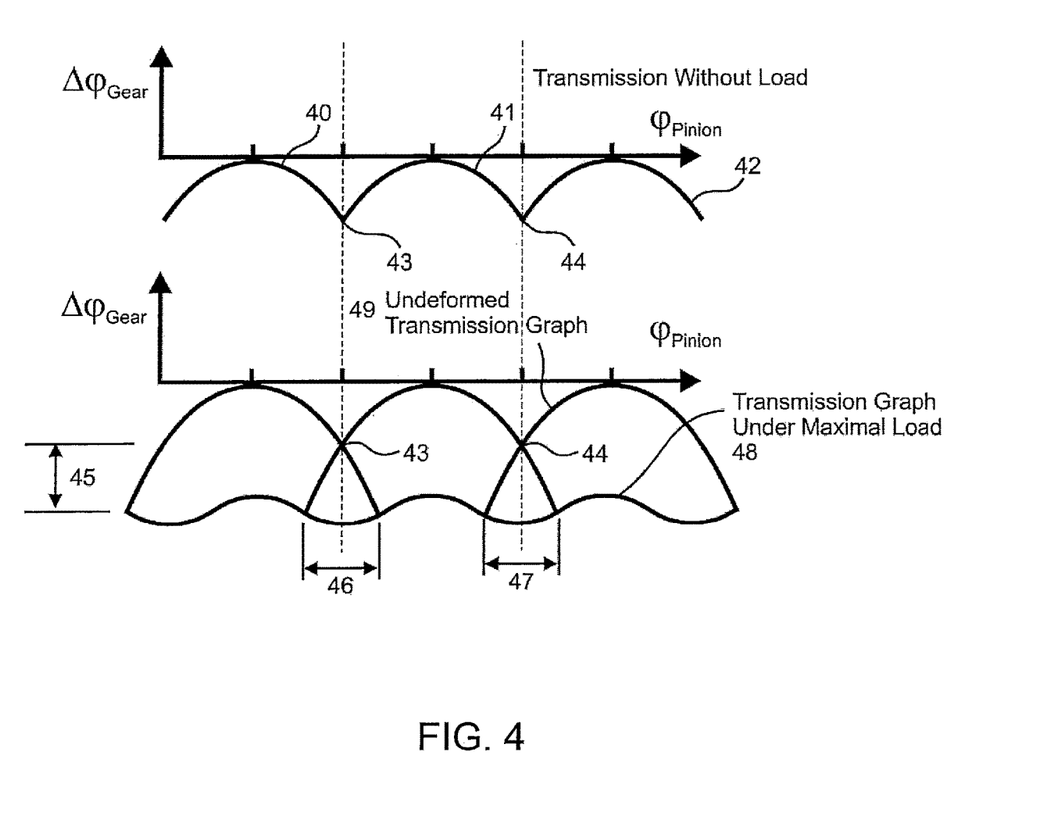
FIG. 4 shows a parabolic transmission graph in case of no load transmission on top. At the bottom of FIG. 4 the parabolic transmission graph 49 is drawn which includes the excess portions outside of the no load tooth contact (area 45). Also at the bottom of FIG. 4 the graphic of the transmission graph in case of a load transmission 48 is shown.

FIG. 4 shows the effective motion transmission graphs 40, 41 and 42 of three consecutively meshing tooth pairs while transmitting low to zero torque. At the lower portion of FIG. 4, a parabolic transmission graph 49 is drawn which includes the excess portions outside of the no load tooth contact (area 45 below the transfer points 43 and 44). At the bottom of FIG. 4 the graphic of the transmission graph in case of a transmission load affected deflection 48 is shown. Transmission graphs under load can be generated via finite element calculation using the digital flank surfaces. In all typical cases, the transmission graphs under load are similar to harmonic curves. It can be observed as a typical transmission noise phenomenon that transmissions emit less noise under partial or high load as compared to low load transmissions.

As torque is applied, the effective graph deforms the initial motion graphs 40, 41 and 42 below the intersecting points 43 and 44. In order to avoid harsh edge contact the parabola shaped motion graphs are extended below the intersecting points 43 and 44 by the amount of 45. Those extended parabolas allow the consecutive tooth pairs to develop transmission contact of two pair of teeth simultaneously in sections 46 and 47 in case of a load affected motion graph deformation 48. The maximally acceptable load for a gearset is limited by the parabola extension 45. It is an interesting observation that motion graphs under load appear as periodic functions with shapes similar to sine functions. The noise critical condition of bevel and hypoid gears in most common applications is the zero to low load conditions that graphs 40, 41 and 42 represent.

Figure 5:
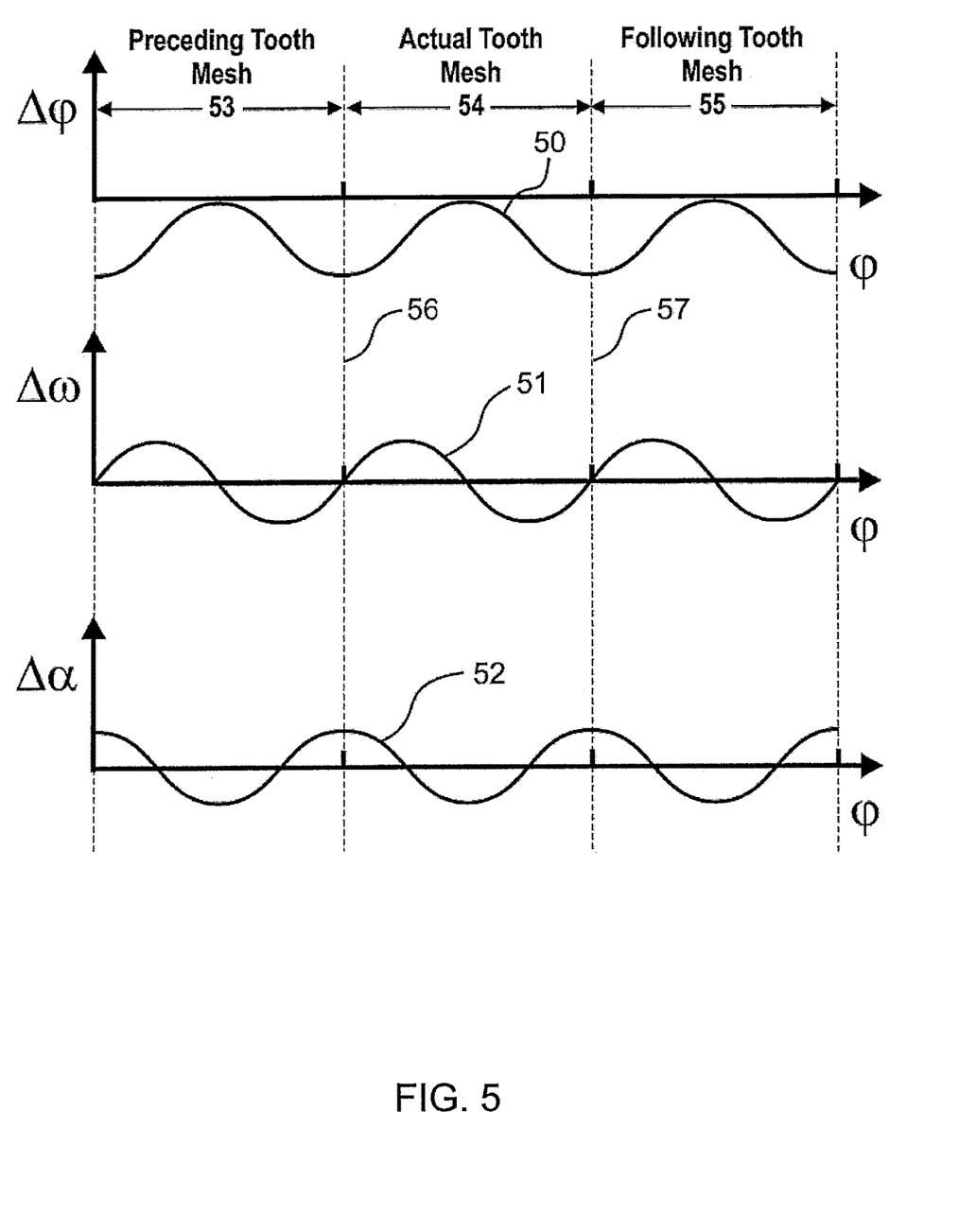
FIG. 5 shows a sinusoidal motion graph, an angular velocity graph and an angular acceleration graph for three consecutive pairs of teeth.

The inventive method proposes sinusoidal shapes of motion transmission graphs for gears to reduce the low load noise emission. FIG. 5 shows on top a cosine shaped motion graph 50 representing the mesh of three consecutive pair of teeth 53, 54 and 55. The first derivative of the motion graph $d\Delta\varphi_{Gear}/d\varphi_{Pinion}$ which represents the angular velocity variation of the gear in case of a constant pinion RPM is shown as graph 51 in the center of FIG. 5. The bottom graphic 52 in FIG. 5 shows the second derivative of the motion graph $d^2\Delta\varphi_{Gear}/d\varphi^2_{Pinion}$ which represents the angular acceleration of the driven gear in case of a constant pinion RPM. A sinusoidal function as motion graph 50 will lead to smooth transitions between the different tooth meshes and eliminate any steps or peaks at the transfer points (points where the graphs 50, 51 and 52 pass the lines 56 and 57.

The cosine shaped motion graph 50 in FIG. 5, compared to FIG. 1, will deliver a sine shaped angular velocity graph 51 and a cosine function as angular acceleration graph 52. The angular acceleration 52 therefore is still a harmonic graph which shows no steps or peaks.

Figure 6:
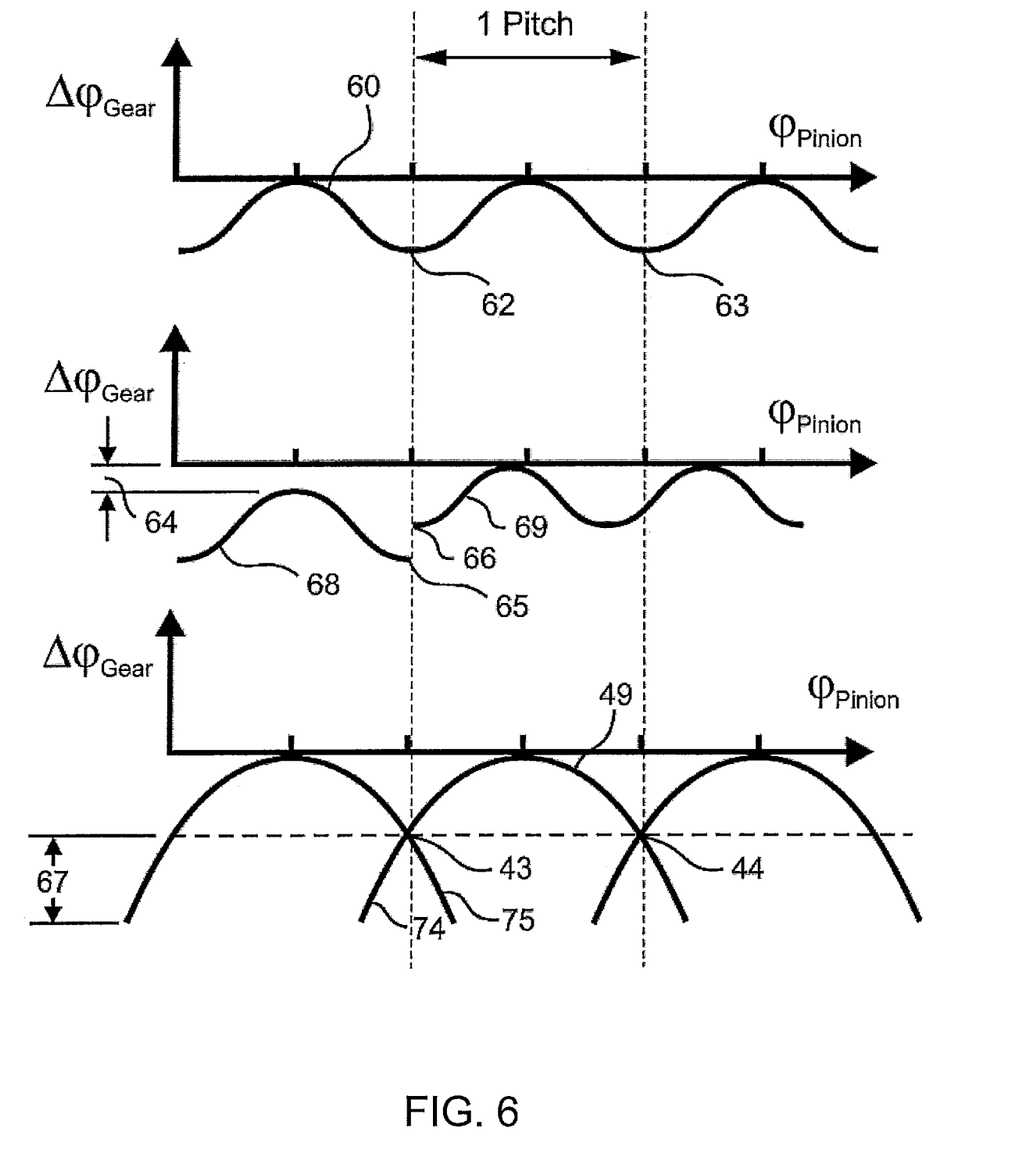
FIG. 6 shows a sinusoidal motion graph 60 in case of no load transmission and a sinusoidal motion graph 68 of one meshing tooth pair in case of load transmission. 69 is the part of the motion graph of the consecutive tooth pairs which do not transmit any load in the shown instance. At the bottom of FIG. 6 a parabolic motion graph which has excess motion graph amounts below the transfer points 43 and 44 (area 67).

FIG. 6 shows a sinusoidal motion graph 60 in the case of no load transmission and a sinusoidal motion graph 68 of one meshing tooth pair which is shifted by an amount 64 due to load affected tooth deflection. The tooth contact follows the graph 68 in direction $\varphi_{Pinion}$ until the mesh contact steps abruptly from transfer point 65 to transfer point 66 of the un-deformed motion graph 69 of the consecutively meshing tooth pair. At the bottom of FIG. 6 a parabolic motion graph 49 with the transfer points 43 and 44 is shown, which shows an excess motion graph 74 and 75 in area 72. In case of load affected deflections the excess motion graph in area 72 prevents steps between the transfer points of consecutive teeth.

The parabolic motion graph 60 shown in FIG. 6 has the disadvantage that it is only ideal for a zero to light load transmission. If the applied load deflects the motion graph 60 by an amount 64 for example, then the transfer points 65 and 66 will no longer line up which causes an impact that is accompanied with the generation of high noise because the sinusoidal shape does no longer exist. The inventive solution adds a parabolic shaped continuation of the motion graph below points 62 and 63 which utilizes the section 67 below the transfer points 43 and 44 of the parabolic motion graph.

Figure 7:
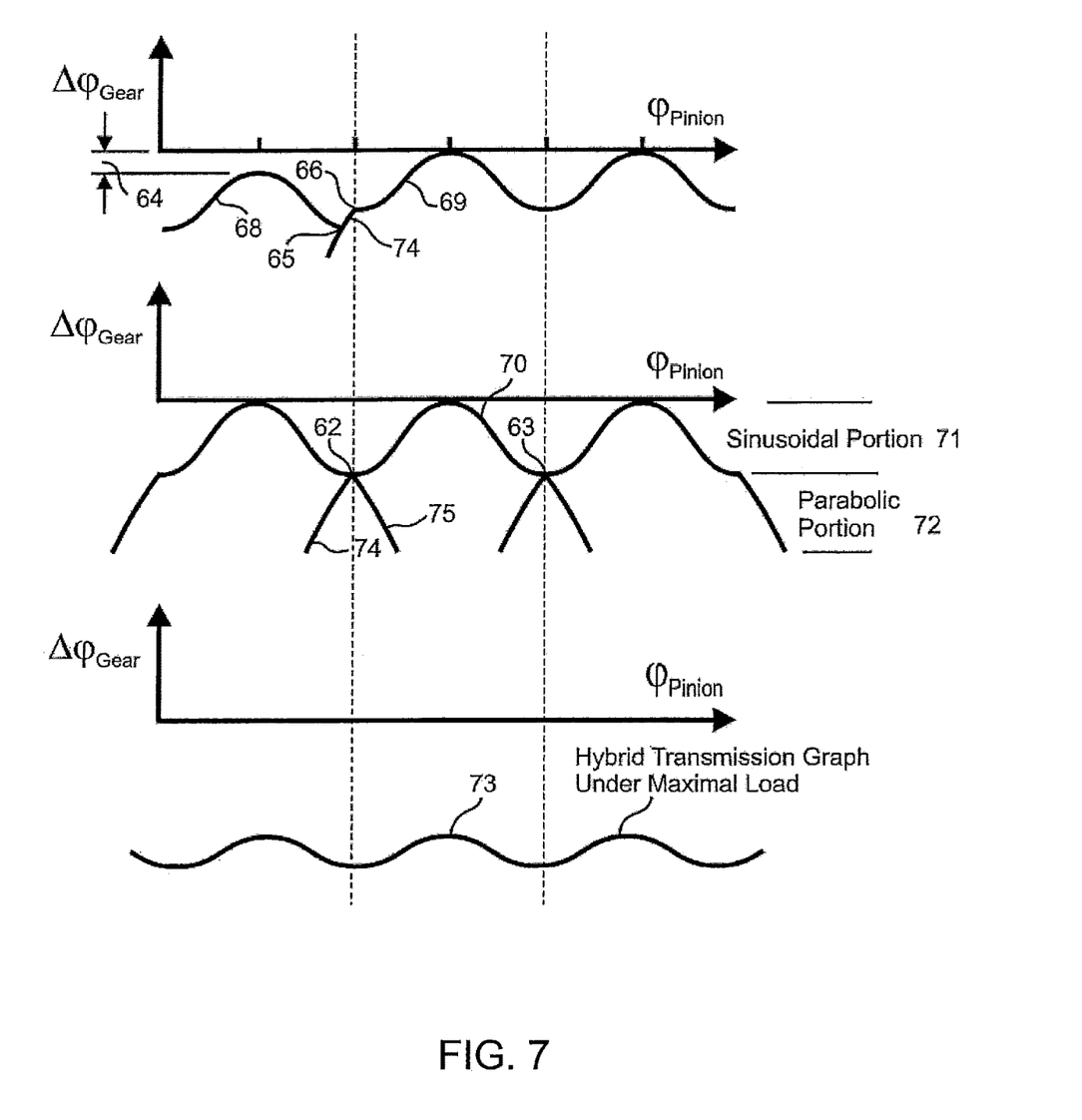
FIG. 7 shows the motion graph 68 which is shifted by the amount 64 due to a load transmission. Transfer points 65 and 66 are connected with line 74. The center graph of FIG. 7 shows the inventive hybrid motion graph 70. At the bottom of FIG. 7 the hybrid transmission graph as it deflects in case of a load transmission is shown.

FIG. 7 shows the motion graph 68 which is shifted by the amount 64 due to a load transmission. As the transmission error follows graph 68, it will be moving from transfer point 65 along graph 74 to the sinusoidal portion of the un-deformed consecutive tooth pair 69. Line 74 is part of the original parabola shaped motion graph which allows a smooth transition from deformed to un-deformed motion graph with minimized entrance impulse. The center graphic in FIG. 7 shows the inventive synthesis between sinusoidal motion graph shape 70 in the stage of zero or light load and parabolic extensions 74 and 75 below the zero or light load. The lower graph in FIG. 7 shows the inventive motion graph 73 after its deformation due to a load application.

In the motion graph 70 of FIG. 7, the upper section 71 of the graph is a sinusoidal function which accommodates the light load condition and in the section 72 below the transfer points 62 and 63 the motion graph has a parabolic function. This combination will provide lowest vibration and noise generation as well as the ability to transmit higher loads. Although the inventive motion graph is a hybrid combination of sinusoidal and parabolic elements, finite element calculations (or actual Single-Flank testing conducted on a gear testing machine such as the 360AT available from The Gleason Works, see commonly-assigned U.S. Pat. No. 7,553,115) show that the motion graph 73 under nominal load will still be a function which resembles a sine function.

Figure 8:
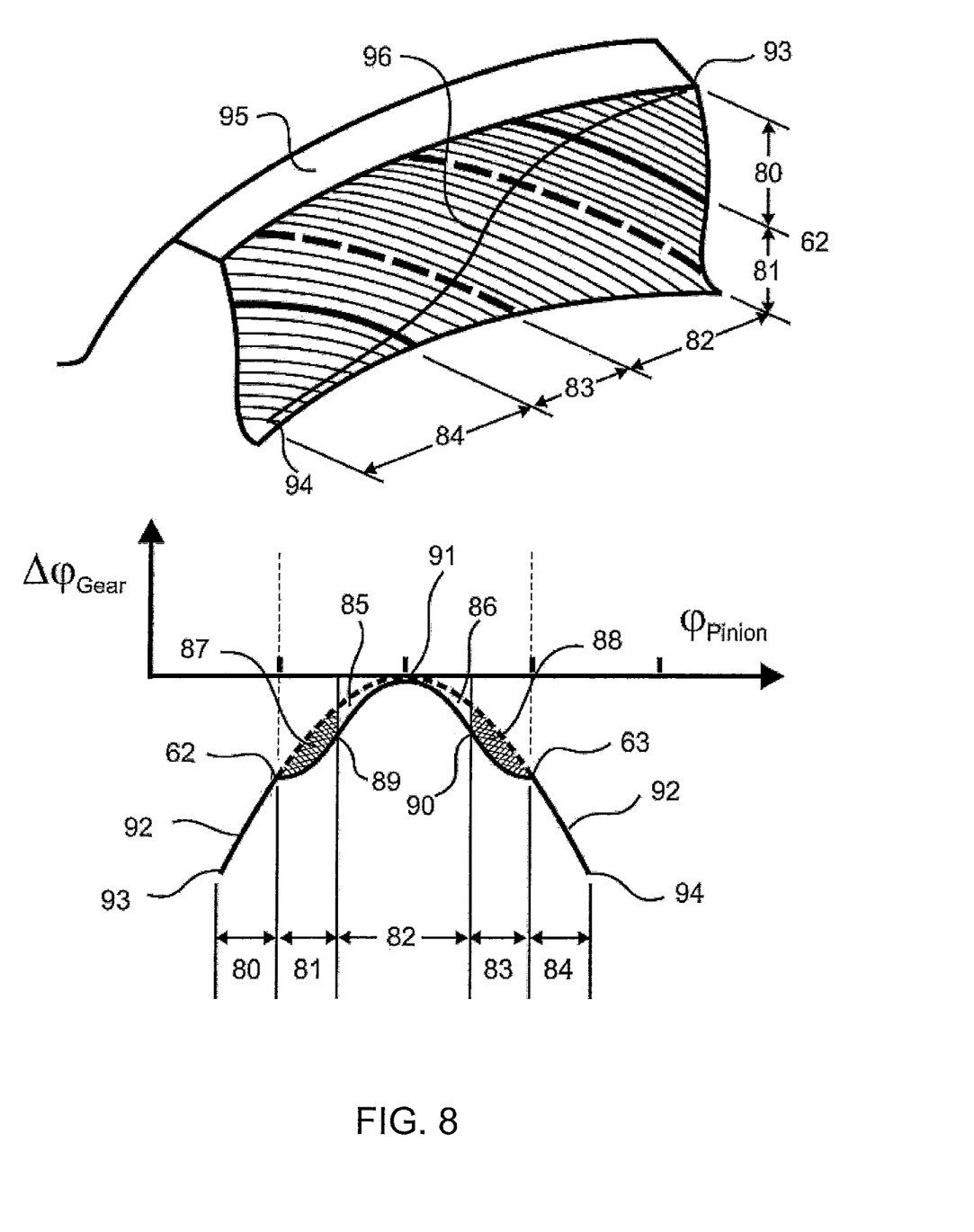
FIG. 8 shows the Universal Motion tooth sections proposed to realize the inventive hybrid motion graph.

FIG. 8, at top, shows a three-dimensional graphic of a pinion tooth 95. The Universal Motion Concept (UMC) can separate a tooth flank in a heel section a center section and a toe section. See commonly-assigned U.S. Pat. No. 5,580, 298 the disclosure of which is hereby incorporated by reference. The tooth 95 has on the flank surface a heel dwell section 80 with the unmodified flank surface. The following section 81 is modified with a UMC heel section. The center section 82 is modified with center UMC. Section 83 is modified with a UMC toe section. The last section 84 is the toe dwell section without any UMC modifications to the flank surface. The lower graph in FIG. 8 shows the motion transmission graph which corresponds to the meshing of a tooth pair from entrance point 93 to exit point 94 along the path of contact 96. The motion graph begins with the heel dwell section 80, followed by the UMC heel section, the center UMC section, the UMC toe section and ends with the unmodified toe dwell section.

The invention includes the utilization of the non-linear UMC flank surface modification adjusted to the different flank sections in order to realize the inventive hybrid motion graph. In the center section 82 the existing parabolic function is modified to approximate the upper half of a sine function from the top 91 to the inflection points 89 and 90. This so called "center UMC" removes the additional amounts of material 87 and 88.

The lower left half of the sine function between the points 89 and 62 can be approximated by a UMC heel section which is superimposed on the center UMC. (The center UMC initially extends over the entire flank and then selected sections, e.g. heel, toe, are further modified by superimposing additional UMC modifications). The superimposed heel UMC eases the modification amounts back to the original parabolic motion graph 92. Between point 62 and point 93 the original motion graph shape 92 remains.

The lower right half of the sine function between the points 90 and 63 can be approximated by a UMC toe section which is superimposed to the center UMC. The superimposed toe UMC eases the modification amounts back to the original parabolic motion graph 92. Between point 63 and point 94 the original motion graph shape 92 remains.

The present inventive method is preferably carried out on a free-form gear manufacturing machine of the type disclosed by commonly-assigned U.S. Pat. No. 4,981,402 to Krenzer et al. or U.S. Pat. No. 6,712,566 to Stadtfeld et al. the disclosure of which are hereby incorporated by reference. In developing the appropriate tooth flank surface for the inventive motion graph, such as shown in FIG. 8, a motion graph is preferably developed, based on the particular tooth surface and contact pattern desired, by utilization of tooth contact analysis software (such as UNICAL software commercially available from The Gleason Works) and the procedure set forth in previously mentioned U.S. Pat. No. 5,580,298.

Once the desired transmission motion graph is determined, machine settings (e.g. grinding machine settings or cutting machine settings) are obtained to direct motion of a tool, such as a grinding wheel for example, relative to the surface of the workpiece about and/or along the axes of the machine to form the desired tooth surface.

The method comprises rotating the tool and bringing the tool and the tooth flank into contact. Relative movements are provided between the tool and the gear to traverse the tool across the tooth flank along a path whereby the path produces a tooth flank geometry of a form which, when brought into mesh with a mating tooth flank under no load or light load to form a tooth pair, provides a motion graph curve comprising a sinusoidal portion and a parabolic portion as shown in FIG. 7.

Figure 9:
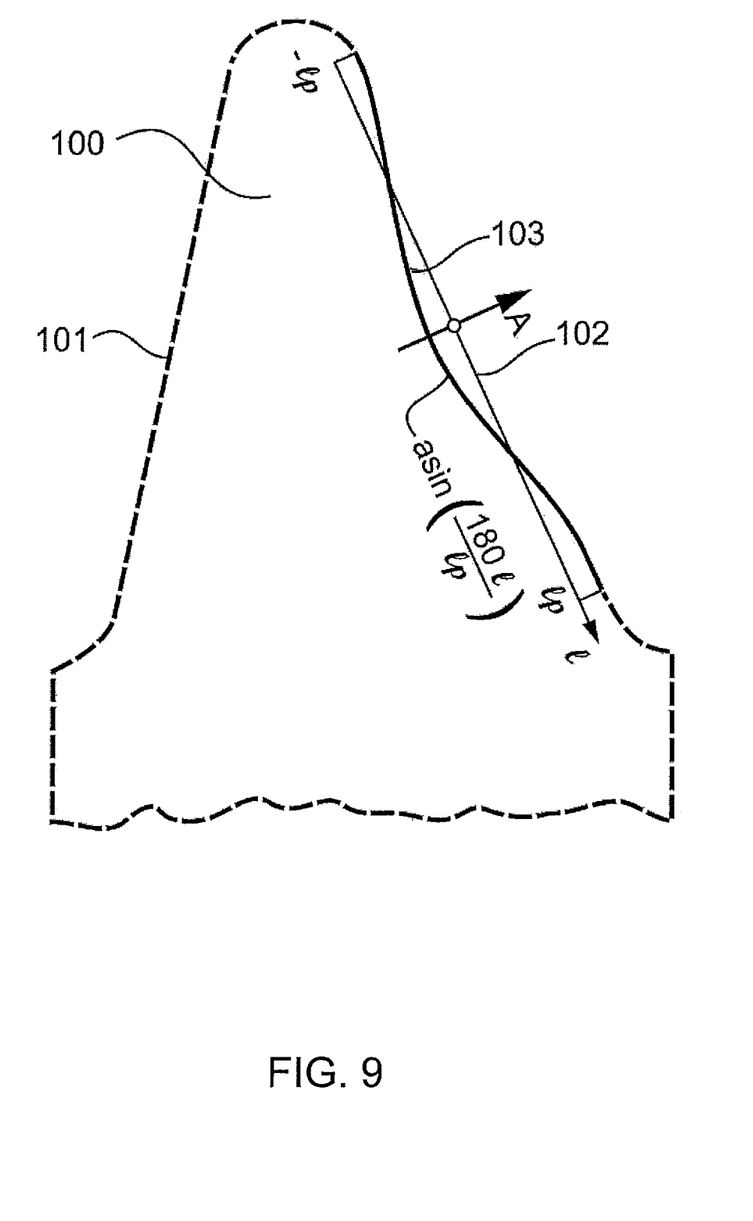
FIG. 9 shows a blade cutting edge with a sinusoidal modification.

In cases of a dominant tooth length orientation of the path of contact (bias in), the sinusoidal motion graph can be achieved best with the three UMC section plus the two dwell sections as explained with reference to FIG. 8. However, in cases, where the path of contact orientation is dominant in the profile direction, a sinusoidal modification 103 of a straight or curved cutting (or grinding) edge 102, as shown in FIG. 9, is also possible in order to achieve a motion graph which is sinusoidal in the section between the transfer points. Instead of a sinusoidal function, the sinusoidal cutting (or grinding) edge shape 103 can also be approximated with three radii.

FIG. 9 shows the two-dimensional view of a cutting blade profile 100. The non-cutting clearance side 101 of the blade profile is a straight line. The original cutting profile 102 is a straight or a curved line. The effective profile 103 of the blade in FIG. 9 follows a sinusoidal function $a*\sin(180°*I/I_p)$. The sine function in FIG. 9 as shown requires a negative value for the coefficient "a". If the path of contact orientation is dominant in the tooth profile (i.e. height) direction, then the sinusoidal modification of the cutting edge will also achieve the sinusoidal shape of the motion transmission graph.

The modification of the cutting edge of a gear cutting blade, or the profile of a grinding wheel, to a sinusoidal form is usually done as an alternative to machine-directed tool and workpiece relative motions for providing the resulting inventive sinusoidal-parabolic shape of the motion transmission graph. However it is also contemplated that the edge modification be utilized in combination with the machine-directed tool and workpiece relative motions for providing the resulting inventive sinusoidal-parabolic shape of the motion transmission graph.

Also contemplated is applying machine-directed tool and workpiece relative motions to one member of a gear set, preferably the pinion, and providing tool edge modification to the other member of the gear set, preferably the ring gear. The combination thereof providing the inventive sinusoidal-parabolic shape of the motion transmission graph.

The skilled artisan will recognize that the tooth surfaces of either member of a mating gear set may be machined in order to arrive at the desired motion graph with the tooth surfaces of the other member remaining in some reference condition such as a theoretical conjugate tooth surface. However, the present invention also contemplates tooth surfaces of both mating members being machined by respective tools such that when brought into mesh, the mating tooth surfaces together provide the desired motion graph. In this instance, the motion graph would appear in the same general manner as shown in FIG. 8. Even though both members comprise some motion error, the motion graphs are indicative of total amount of error of one member relative to the other.

Figure 10:
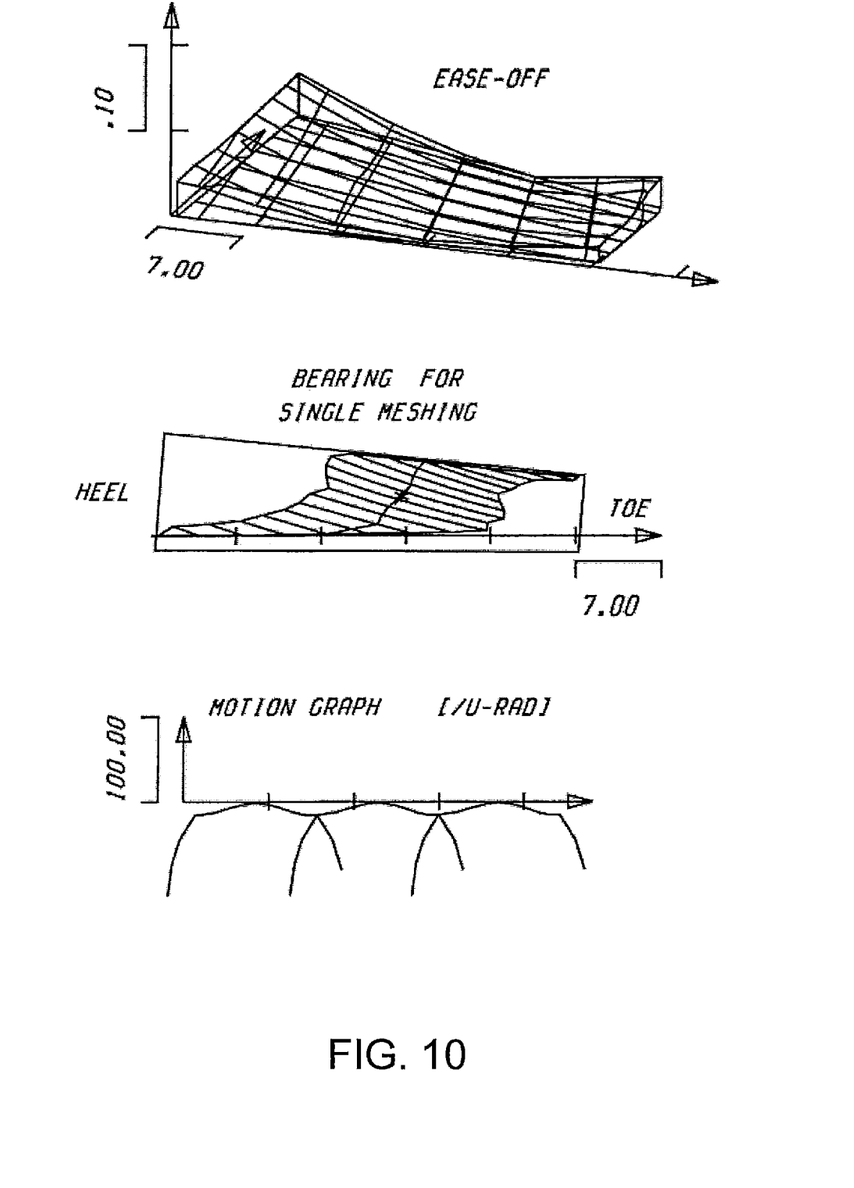
FIG. 10 shows the result of a hybrid motion graph development for a gear.

FIG. 10 shows an example of the result of a hybrid motion graph development for the bevel gear set described in Table 1.

TABLE 1

|  | Pinion | Ring Gear |
|---|---|---|
| Number of Teeth | 17 | 45 |
| Normal Module at Center |  | 3.614 mm |
| Face Width | 39.84 mm | 34.80 mm |
| Pinion Offset | 35.00 mm |  |
| Pressure Angle (included angle) | 20 degrees |  |
| Shaft Angle | 90.00 degrees |  |
| Outside Diameter | 116.35 mm | 210.62 mm |
| Mean Spiral Angle | 44.99 degrees | 23.66 degrees |

The motion graph (lower graphic) is preferably determined with assistance of the previously mentioned analysis and optimization software UNICAL. On top is the Ease-Off which shows the flank modification from conjugate which has been accomplished with three UMC sections and two dwell sections (see attached table with grinding machine and dresser settings). The contact pattern in the center graphic looks basically conventional. The motion graph in the bottom graphic of FIG. 10 reflects the upper sinusoidal area (for the low load transmission) and the parabolic extensions at the intersecting points between the three graphs. The three repeating graphs represents three proceeding tooth meshes.

Table 2 shows the basic machine settings and UMC settings and Table 3 shows the dresser settings of a free form bevel gear grinding machine for grinding the pinion member. The settings in Table 2 and Table 3 have been determined in the course of the development of the hybrid sinusoidal-parabolic motion graph shown in FIG. 10.

TABLE 2

| | Basic Machine Settings | | |
|---|---|---|---|
| 1. | Radial Distance | 96.565 | mm |
| 2. | Tilt Angle | 24.721 | deg |
| 3. | Swivel Angle | −28.378 | deg |
| 4. | Work Offset | 30.432 | mm |
| 5. | Machine Root Angle | −2.494 | deg |
| 6. | Machine Center to Cross Pt. | −1.010 | mm |
| 7. | Sliding Base | 25.024 | mm |
| 8. | Ratio of Roll | 2.517275 | |
| | Universal Motions - Toe Section | | |
| 9. | Modified Roll-2C | −0.02264 | 1/rad |
| 10. | Modified Roll-6D | 0.01165 | 1/rad$^2$ |
| 11. | Modified Roll-24E | −0.19332 | 1/rad$^3$ |
| 12. | Modified Roll-120F | 0.00000 | 1/rad$^4$ |
| 13. | Helical Motion-1st Order | 0.00000 | 1/rad |
| 14. | Helical Motion-2nd Order | 5.74640 | 1/rad$^2$ |
| 15. | Helical Motion-3rd Order | 15.22780 | 1/rad$^3$ |
| 16. | Helical Motion-4th Order | 40.68800 | 1/rad$^4$ |
| 17. | Vertical Motion-1st Order | 0.00000 | 1/rad |
| 18. | Vertical Motion-2nd Order | 0.00000 | 1/rad$^2$ |
| 19. | Vertical Motion-3rd Order | 0.00000 | 1/rad$^3$ |
| 20. | Vertical Motion-4th Order | 0.00000 | 1/rad$^4$ |
| 21. | Radial Motion-1st Order | 0.00000 | 1/rad |
| 22. | Radial Motion-2nd Order | −1.28840 | 1/rad |
| 23. | Radial Motion-3rd Order | −7.75120 | 1/rad$^3$ |
| 24. | Radial Motion-4th Order | −7.12200 | 1/rad$^4$ |
| | Universal Motions - Center Section | | |
| 25. | Modified Roll-2C | 0.01281 | 1/rad |
| 26. | Modified Roll-6D | −0.14351 | 1/rad$^2$ |
| 27. | Modified Roll-24E | 0.41420 | 1/rad$^3$ |
| 28. | Modified Roll-120F | −0.14920 | 1/rad$^4$ |
| 29. | Helical Motion-1st Order | 7.57470 | 1/rad |
| 30. | Helical Motion-2nd Order | −1.64620 | 1/rad$^2$ |
| 31. | Helical Motion-3rd Order | 1.48300 | 1/rad$^3$ |
| 32. | Helical Motion-4th Order | −9.90300 | 1/rad$^4$ |
| 33. | Vertical Motion-1st Order | 0.00000 | 1/rad |
| 34. | Vertical Motion-2nd Order | 0.00000 | 1/rad$^2$ |
| 35. | Vertical Motion-3rd Order | 0.00000 | 1/rad$^3$ |
| 36. | Vertical Motion-4th Order | 0.00000 | 1/rad$^4$ |
| 37. | Radial Motion-1st Order | −0.05770 | 1/rad |
| 38. | Radial Motion-2nd Order | 0.11340 | 1/rad$^2$ |
| 39. | Radial Motion-3rd Order | 1.49600 | 1/rad$^3$ |
| 40. | Radial Motion-4th Order | −3.40000 | 1/rad$^4$ |
| | Universal Motions - Heel Section | | |
| 41. | Modified Roll-2C | −0.09661 | 1/rad |
| 42. | Modified Roll-6D | 0.51331 | 1/rad$^2$ |
| 43. | Modified Roll-24E | −1.04120 | 1/rad$^3$ |
| 44. | Modified Roll-120F | 0.00000 | 1/rad$^4$ |
| 45. | Helical Motion-1st Order | 0.00000 | 1/rad |
| 46. | Helical Motion-2nd Order | 9.69870 | 1/rad$^2$ |
| 47. | Helical Motion-3rd Order | −39.75600 | 1/rad$^3$ |
| 48. | Helical Motion-4th Order | 101.84100 | 1/rad$^4$ |
| 49. | Vertical Motion-1st Order | 0.00000 | 1/rad |
| 50. | Vertical Motion-2nd Order | 0.00000 | 1/rad$^2$ |
| 51. | Vertical Motion-3rd Order | 0.00000 | 1/rad$^3$ |
| 52. | Vertical Motion-4th Order | 0.00000 | 1/rad$^4$ |
| 53. | Radial Motion-1st Order | 0.00000 | 1/rad |
| 54. | Radial Motion-2nd Order | 1.36120 | 1/rad$^2$ |
| 55. | Radial Motion-3rd Order | −12.68200 | 1/rad$^3$ |
| 56. | Radial Motion-4th Order | 15.91300 | 1/rad$^4$ |

TABLE 3

| | Grinding Wheel Specifications | |
|---|---|---|
| 1. | Spread Blade/OB/IB | Spread Blade |
| 2. | Wheel Diameter | 188.055 mm |
| 3. | Point Width | 2.022 mm |
| 4. | Outside Pressure Angle | 10.500 deg |
| 5. | Inside Pressure Angle | 31.687 deg |
| 6. | Outside Profile Radius of Curvature | 0.000 mm |
| 7. | Inside Profile Radius of Curvature | 1016.000 mm |

Although the invention has been discussed with reference to bevel and hypoid gears, the invention is not limited thereto. Other types of gears, such as spur and helical gears, for example, may be processed in accordance with the disclosed method. The invention is preferably realized via a finishing process such as by an abrasive process, for example, grinding or honing, or by a cutting process such as hard skiving. However, the invention may also be realized via so-called "soft" processes such as rough cutting for example.

As an alternative to describing the motion graph in terms of a sine function, a higher order function may be utilized. For example, with reference to FIG. 8, a 4$^{th}$ order function with inflection points at 89 and 90 may be utilized to describe a desired motion graph.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of machining a tooth flank of a gear with a finishing tool, said method comprising:
   rotating said finishing tool and bringing said tool and said tooth flank into contact,
   providing relative movement between said tool and said gear to traverse said tool across said tooth flank along a path,
   whereby said path produces a tooth flank geometry of a form which, when brought into rolling mesh with a mating tooth flank under no load or light load to form a tooth pair, provides a motion transmission error graph curve consisting of a sinusoidal curve.

2. A free-form gear manufacturing machine, said machine having a computer control and a plurality of computer-controlled axes with said computer control being operable to control said plurality of computer-controlled axes whereby a tool and a workpiece having at least one tooth flank are movable relative to one another,
   said computer control including a computer program having commands whereby said plurality of axes of said gear manufacturing machine are directed to provide relative movements between the tool and the workpiece to traverse the tool across the tooth flank along a path whereby the path produces a tooth flank geometry of a form which, when brought into rolling mesh with a mating tooth flank under no load or light load to form a tooth pair, provides a motion transmission error graph curve consisting of a sinusoidal curve.

* * * * *